United States Patent [19]

Nashan et al.

[11] Patent Number: 4,668,343
[45] Date of Patent: May 26, 1987

[54] METHOD FOR DRY COOLING RED-HOT COKE

[75] Inventors: Gerd Nashan, Oberhausen; Josef Volmari, Bochum; Horst Dungs, Herne; Dieter Breidenbach, Waltrop; Kurt Lorenz, Hattingen, all of Fed. Rep. of Germany

[73] Assignee: Firma Carl Still GmbH & Co. KG, Fed. Rep. of Germany

[21] Appl. No.: 649,130

[22] Filed: Sep. 10, 1984

[30] Foreign Application Priority Data

Sep. 10, 1983 [DE] Fed. Rep. of Germany ........ 3332702

[51] Int. Cl.$^4$ ............................................. C10B 39/02
[52] U.S. Cl. ...................................... 201/39; 202/228
[58] Field of Search .................. 201/39; 202/227, 228; 122/7 R; 48/67; 34/168; 165/104.15

[56] References Cited

U.S. PATENT DOCUMENTS

| | | | |
|---|---|---|---|
| 1,349,497 | 8/1920 | Crush | 48/67 |
| 4,338,161 | 7/1982 | Weber et al. | 201/39 |
| 4,370,202 | 1/1983 | Weber et al. | 202/228 |
| 4,370,203 | 1/1983 | Schmid et al. | 202/228 |

FOREIGN PATENT DOCUMENTS

| | | | |
|---|---|---|---|
| 41497 | 12/1981 | European Pat. Off. | 201/39 |
| 71804 | 2/1983 | European Pat. Off. | 202/228 |
| 1080968 | 10/1954 | Fed. Rep. of Germany | 202/228 |

*Primary Examiner*—Barry S. Richman
*Assistant Examiner*—Joye L. Woodard
*Attorney, Agent, or Firm*—McGlew and Tuttle

[57] ABSTRACT

A method of dry cooling red-hot coke in a vessel having an antechamber with a small discharge leading to a vertically elongated cooling chamber which is of larger dimension than the discharge and with both the cooling chamber and the antechamber having fluid cooling tubes in one or more walls and the ceiling thereof and also having cooling tube bank diverging downwardly from the discharge of the antechamber into the cooling chamber, comprises directing the red-hot coke to be cooled downwardly through the antechamber and into the cooling chamber so as to maintain a charge of coke in the cooling chamber to the conical charge cone of the cooling tubes adjacent the top of the cooling chamber which extends downwardly below the discharge, thereafter circulating a coolant through the cooling tubes to effect transfer of sensible heat from the coke to the fluid and directing a cooling gas from the bottom of the cooling upwardly through the coke and above the entire area of the coke charging cone and then into an exhaust duct to one or more waste heat boilers.

4 Claims, 5 Drawing Figures

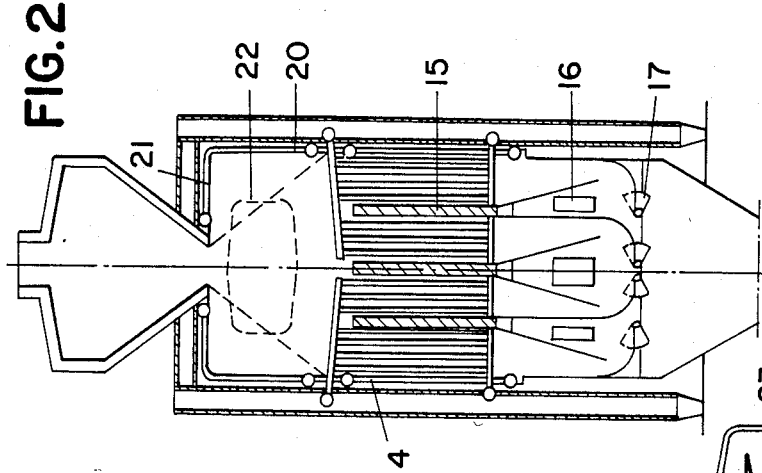
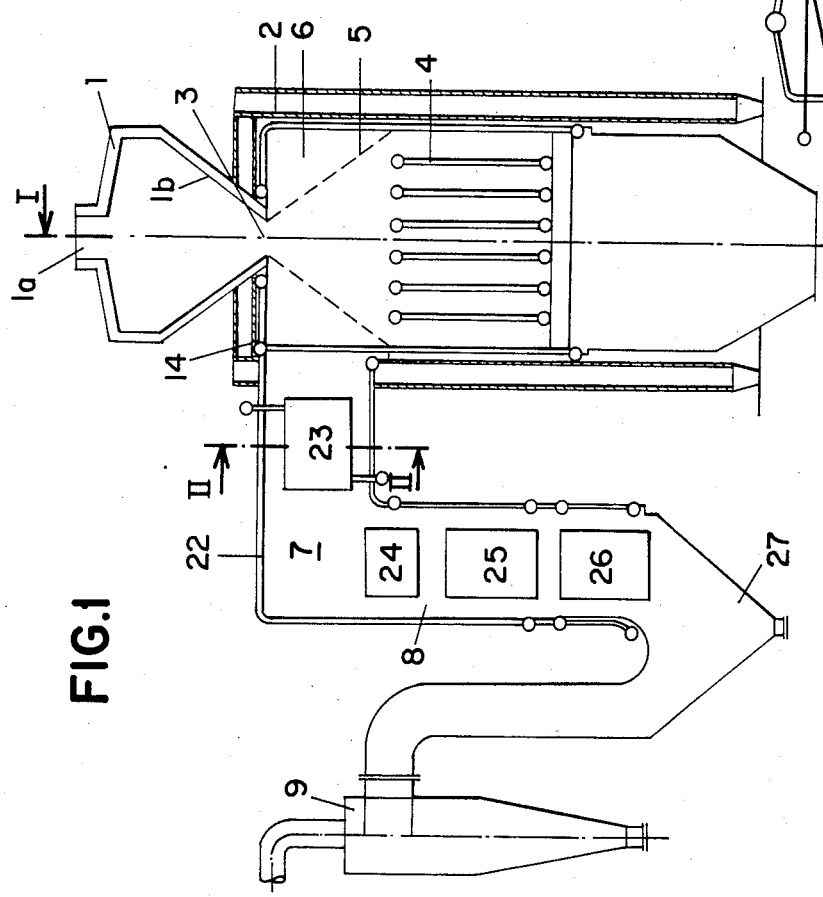

METHOD FOR DRY COOLING RED-HOT COKE

FIELD AND BACKGROUND OF THE INVENTION

This invention relates in general to coking and in particular to a new and useful apparatus and method for dry cooling incandescent coke.

A generically similar method of dry cooing red-hot coke is known from German OS No. 29 52 065. That prior art method provides that the sensible heat is transferred from the coke in the cooling chamber partly indirectly through cooling surfaces to a cooling fluid, and partly directly to a gas which is circulated through the hot coke in the direction opposite to the direction in which the coke moves. The method further provides a design of the outer boundary in the upper zone of the cooling chamber in the annular duct through which the cooling gas flows out of the cooling chamber as water cooled walls. The primary goal is to keep the outer wall as cool as possible and to reduce heat losses. In the apparatus provided in that disclosure, the circulated gas flowing out of the coke charge is exhausted through an annular gap about the antechamber. The cross-sectional area of this relatively narrow gap is limited so that also the circulated volume and thus the cooling speed are limited, since the gas velocity must be kept below a certain maximum.

In the meantime, a rectangular or square cooling chambers have proved advantageous in the art, for example such as disclosed in German OS No. 30 13 722 or German OS No. 31 15 437. This prior art provides an exhaustion of the circulated cooling gas laterally below the charge hole of the antechamber. With such a design, the cross sections of the cooling chamber can be considerably enlarged by increasing the number of the parallel inner cooling walls, thus the number of the individual compartments. Such dry cooling arrangements have substantially proved satisfactory, however, with extremely high outputs, a disadvantageous flow pattern may develop above the cooling walls and in the direction of the waste heat boiler, which may result in a non-uniform cooling of the coke in the cooling chamber.

SUMMARY OF THE INVENTION

The present invention is directed to a design making sure that even with extremely high cooling chambers, the circulating cooling gas will leave the coke charge, and that the coke will be cooled, uniformly, so as to utilize the heat in the best manner directly in the cooling chamber.

To this end, it is provided that after having passed through the coke charge, the circulating gas is directed above the entire area of the cone of charged hot coke in the cooling chamber along one or more tube banks and/or between the tubes of the banks into an exhaust duct extending thereabove and therefrom, through one or more lateral connecting ducts to waste heat boilers. Consequently in accordance with the invention, the circulating gas passes first vertically upwardly along or between the tubes, so that it is prevented from flowing in the upper portion of the coke charge non-uniformly toward the connecting duct. Simultaneously, and in addition, the hot coke as well as the hot circulating gas give heat away by radiation and convection to the evaporator tubes. Only after the circulating gas has passed between all the tubes, its flow is deflected horizontally in the exhaust duct and directed laterally toward the connecting duct. Suprisingly, the result of this inventive arrangement is that the circulating gas flows uniformly through the entire coke charge, thus also above the cooling walls which extend in parallel in the interior of the charge, and, what is of primary importance, that the coke is cooled uniformly.

To carry out the method, the invention further provides an apparatus in which tube banks are provided in the cooling chamber, spaced a certain distance from the coke charge and extending substantially parallel to the charge cone surface, along or through which the circulating gas flows. Since with the given dimensions, the shape of the charge cone varies only very little with different coke quantities and sizes, the tube banks can be positioned so as to be always substantially parallel to the charge cone surface. What is important is to eliminate as far as possible any contact between the tube bank and hot pieces of coke. The abrasion of the individual tubes can thus be minimized and the tube walls may be relatively thin, thus well suitable for conducting heat. In this connection, it has been found that to position a tube bank 200 to 800 mm above the coke charge cone surface, preferably 200 to 400 mm, is particularly advantageous. This distance is also satisfactory for avoiding contact between the tube banks and hot coke particles which might have been partly entrained by the gas stream and drop back again to the charge cone.

The invention further provides that the exhaust duct above the tube banks is formed by a substantially horizontal cooling chamber ceiling extending around the charge hole, and by the tube banks themselves. Experience has shown that a duct with a triangular cross section is satisfactory for conducting the entire circulating gas to the duct connecting to the waste heat boiler. This particularly applies if the cross sectional area of the charge hole at the bottom of the antechamber is substantially smaller than that of the cooling chamber. Advantageously, the entire cooling chamber ceiling around the charge hole and the outer walls of the cooling chamber, as well as the walls of the duct connecting to the waste heat boiler are designed as evaporator surfaces. Heat exchange surfaces clear of the coke charge and without gaps can thus be provided, and the supporting outer walls and the roof of the cooling chamber are thereby protected from the extreme radiated heat.

It is also possible to fill the entire space about the charge cone, up to the cooling chamber ceiling and to the outer walls thereof, with tube nests. This transfers the maximum of heat indirectly to the cooling fluid already in the cooling chamber. Still more of high-pressure steam can thus be produced in the cooling chamber than with prior art apparatus of this kind. The circulating gas amount and the size of the following waste heat cooler are thereby further reduced.

To obtain a uniform exhaust of the circulated gas from the hot coke over the area of the coke charge cone, the invention further provides unequal spacing of the bank tubes. Depending on the specific requirement, a proper distribution of the circulating gas flow over the cross sectional area of the cooling chamber can thus be achieved. More particularly, the spacing of the tubes should decrease in the direction of the duct or ducts connecting to the waste heat boiler. This provides additional presure drops at locations to which the circulating gas preferably flows, and larger cross-sectional areas of flow are formed at locations more remote from the connecting ducts. This makes it possible to draw the gas amounts uniformly distributed over the cross-sectional area of the cooling chamber, into the exhaust duct. With a single connecting duct, it has proved advantageous to provide a spacing of the bank tubes at the side remote from the connecting ducts 2 to 5 times larger than at the side of the connecting duct. With two connecting ducts, the spacing of the tubes between the connecting ducts should be 2 to 3 times larger than of those close to the connecting ducts. This gradation of the tube spacing has proved satisfactory for marking the gas flow distribution uniform.

To further improve the indurect heat transfer and simplify the construction it has been proved advisable to provide additional nests of tubes for pre-evaporation or even superheating which are distributed over the entire cross-sectional area, in the connecting duct extending substantially horizontal, or slightly sloping down toward the waste boiler.

Accordingly it is an object of the invention to provide a method of dry cooling red-hot coke in which the coke is fed into a cooling chamber in a manner so as to form a conicl charge of the coke at the top of the coke fed to the chamber and the cooling gas is circulated upwardly to the cooling chamber and to cool the coke both in the main portion of the cooling chamber and in the upper portion around the charging cone thereof and to also circulate cooling fluid through the cooling tube of the chamber which are arranged in spaced parallel arrangements and also in the area of the conical charge of the coke.

A further object of the invention is to provide an apparatus for effecting cooling of coke in a cooling chamber using fluid cooling tubes arranged in spaced parallel relationship and also a bank of tubes arranged in a conical manner at the top of the charged coke and to also provide means for the flow of cooling gases upwardly through the charged and around the top thereof.

A further object of the invention is to provide a device for cooling red-hot coke which is simple in design, rugged in construction and economical to manufacture.

The various features of novelty which characterize the invention are pointed out with particularity in the claims and annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic elevational view of a dry coke cooling apparatus comprising an antechamber and, downstream, a waste heat boiler and a dust separator;

FIG. 2 is a sectional view taken along the line I—I of FIG. 1;

FIG. 3 is a detail taken along the line II—II of FIG. 1;

DESCRIPTION OF THE PREFERRED EMBODIMENTS

Figure 4:
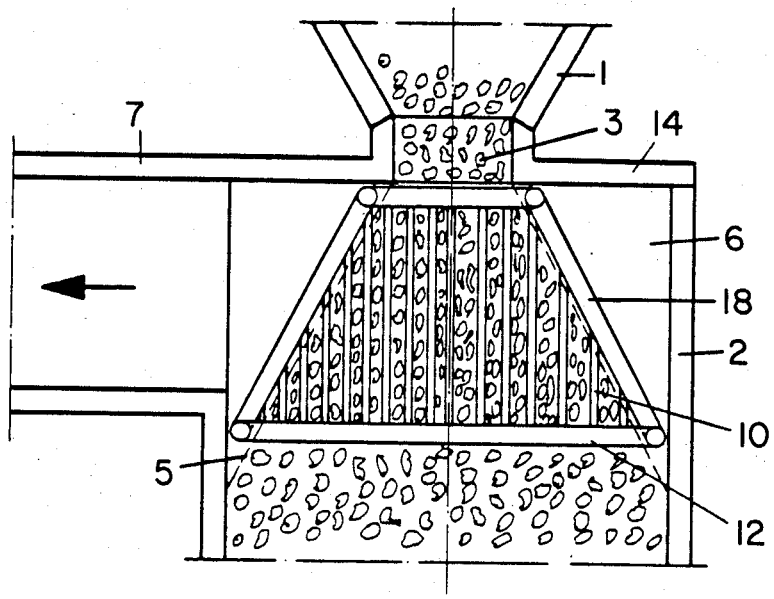
FIG. 4 is an enlarged sectional view of the upper zone inside the cooling chamber.

Referring to the drawings in particular the invention embodied therein comprises a method of an apparatus for dry cooling red-hot coke. In accordance with the invention coke is charged through an opening 1a at the top of an antechamber 1 which has diverging walls 1b which terminate in a lowermost charging hole or passage 3 which connects into a cooling chamber 2. The cooling chamber 2 opens at its top end to a passage or connecting duct 7 leading to one or more waste heat boilers and providing an exhaust for cooling gases which are circulated through a cooling gas supply duct 16 located in the bottom of the cooling chamber 2. Both the antechamber 1 and the cooling chamber 2 are provided with outer fluid cooling walls 14 and the cooling chamber 2 in addition has spaced parallel cooling walls 4. Support walls 15 which are spaced across the cooling chamber also define vertical passages for the gas flow upwardly through the coke which is charged into the cooling chamber up to an amount to maintain a substantially conical coke charge cone 5.

Figure 5:
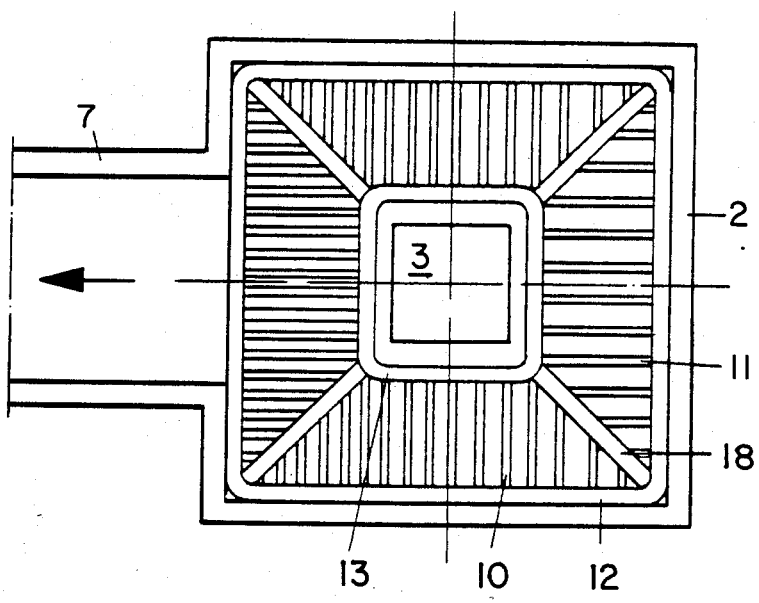
FIG. 5 is a top plan view corresponding to FIG. 4.

In accordance with a further feature of the invention, the upper portion of the cooling chamber in the vicinity of the connecting duct 7 is provided with a bank of tubes 10 arranged in a manner to form a conical array of cooling tubes for cooling the charging cone of the coke. The arrangement also permits the scattering of the cooling gases through spaced tube elements of the bank of tubes 10 and the circulation of the cooling in this area which connects to the connecting ducts 7. The bank of cooling tubes 10 is actually in the form of a truncated pyramid as shown in FIGS. 4 and 5, having four planar trapezoidal sides.

The figures show an antechamber 1 above a cooling chamber 2. At its bottom, funnel-shaped antechamber 1 opens into a charge hole 3 leading to the cooling chamber. Inside cooling chamber 2, cooling walls 4 are provided which extend parallel to each other, and between which the charged coke moves slowly downardly until it is discharged from the cooling chamber through discharge tippers 17 (see FIG. 2). The coke is cooled from below upwardly with circulating gas which flows countercurrently from horizontal supply ducts 16 through calibrated lower outlets and through the coke upwardly, to be drawn through an exhaust duct 6 and laterally through a connecting duct 7 downstream into a waste heat boiler 8 and a following fine dust separator 9. In the cooling chamber the charged hot coal and also the countercurrently flowing circulating gas are connected in a row of rectangular or square compartments which are formed by parallel walls 4 and by supporting walls 15 of refractory material extending perpendicularly thereto. In FIGS. 1 and 2, above the indicated charge cone 5, only evaporator surfaces provided closely adjacent to the outer walls are shown. Inwardly of vertical outer walls 14 of the cooling chamber, evaporator surfaces 20 are provided which also extend vertically, and below the substantially horizontal outer cooling walls 14 of the cooling chamber, horizontal evaporator surfaces 21 are provided. In the shown embodiment of FIG. 1, vertical evaporator surfaces 20 extend from beneath the lower end of the inner cooling walls up to the ceiling 14 of the cooling chamber and form a unit with horizontal evaporator surfaces 21. The inner walls of the substantially horizontal connecting duct 7 which is directly joined to the cooling chamber, and of the waste heat boiler also are equipped with evaporator surfaces 22. To make the showing clear, the inventive tube banks provided above coke charge cone 5 are omitted. They are shown in FIGS. 4 and 5 in which, for the same reason, the outer evaporator surfaces 20, 21, 22 are omitted. However, a combination comprising all these tube banks and evaporator surfaces is considered, in accordance with the invention, the best manner of utilizing the heat within the cooling chamber. According to FIGS. 4 and 5, a canopy of evaporator tubes 10–13 is provided above coke charge cone 5, surrounding upwards an about square aperture subjacent charging hole 3. Starting from the lower, peripheral distributor conduit 12, individual tubes 10 and 11 extend therefrom perpendicularly and obliquely upwardly, which tubes are distributed over a circumference of the charge cone and are spaced from each other unequally. The upwardly extending individual tubes 10, 11 terminate partly in diagonally obliquely and also upwardly extending collecting tubes 18, and partly in a collecting counduit 13 which forms the upper aperture of the canopy. The tubes 10, 11 at the four sides of the canopy may form at each of the sides a trapezoidal grate comprising an oblique collecting tube 18, an upper collecting conduit 13, and water supply and discharge lines of their own. It is also possible to provide a plurality of such tube bank grates one above the other. As particularly shown in FIG. 5, the individual tube banks 10, 11 are spaced apart from each other in an unequal manner.

In the zone close to collecting duct 7, the tubes are narrowly adjacent, while at the opposite side they are widely spaced from each other. This is to prevent the whole volume of circulating gases from short circuiting to the collecting duct. Since the spacing is unequal, the circulating gas at the opposite side flows first upwardly into exhaust duct 6 and only then, above tubes 10, 11, 18 toward collecting duct 7. To better utilize the available cross-sectional areas of flow and thus reducing the overall dimensions of the heat exchange devices, evaporator tube nests 23, distributed over the entire cross-sectional area, are provided only in the upper, horizontal portion of collecting ducts 7. After having passed through this tube nest 23, the circulating gas reaches the vertical part of waste heat boiler 8 where it passes sequentially through superheater tube nest 24, evaporator tube nest 25, and feed-water preheater 26, to be directed to fine dust separator 9. A funnel shaped fine dust exhaust 27 is provided below heat exchange devices 24, 25, 26.

While specific embodiments of the invention have been shown and described in detail to illustrate the application of the principles of the invention, it will be understood that the invention may be embodied otherwise without departing from such principles.

What is claimed is:

1. A method of dry cooling red-hot coke in a vessel having an antechamber with a discharge opening at its bottom, a vertically elongated cooling chamber having a rectangular cross-section of larger dimensions than the antechamber connected to the antechamber, said cooling chamber having vertical cooling walls, a horizontal ceiling wall and an exhaust connection in one of the vertical cooling walls, the discharge opening extending through the ceiling wall, each of the chambers having fluid cooling pipes in their walls a plurality of spaced apart cooling tubes in the form of a truncated pyramid having a lower cross-section of substantially the same dimensions as that of the cooling chamber and extending downwardly from the discharge opening to the vertical cooling walls, and the exhaust connection being above the lower cross-section of the pyramid, the method comprising: directing coke to be cooled downwardly, through the antechamber, through the discharge opening in the bottom thereof and into the cooling chamber in an amount so as to form a charge of coke in the cooling chamber having an upper cone-shaped surface circulating a fluid coolant through the cooling tubes to effect tranfer of sensible heat from the coke to the fluid; directing a coolant gas from the bottom of the cooling chamber upwardly through the coke; drawing off the coolant gas above the upper cone-shaped surface of the coke charge through spaces between the cooling tubes; and thereafter directing the coolant gas into the exhaust connection.

2. A method of dry cooling red-hot coke according to claim 1 including providing spaces between the cooling tubes which are closer together at a side of the truncated pyramid adjacent the exhaust connection as compared with the spacing between the cooling tubes on sides of the truncated pyramid spaced away from the exhaust connection whereby a flow of the coolant gas is restricted through the truncated pyramid adjacent the exhaust connection.

3. A method of dry cooling red-hot coke according to claim 2, further comprising: passing the coolant gas through the exhaust connection and then through one or more waste heat boilers.

4. A method of dry cooling red-hot coke according to claim 1, further comprising: passing the coolant gas through the exhaust connection and then through at least one of an evaporator tube bundle, a superheater tube bundle and a feed water preheater tube bundle.

* * * * *